(12) United States Patent
Wang et al.

(10) Patent No.: US 7,212,355 B2
(45) Date of Patent: May 1, 2007

(54) IMAGE PICK-UP LENS SYSTEM

(75) Inventors: Zhuo Wang, Beijing (CN); Guo-Fan Jin, Beijing (CN); Ying-Bai Yan, Beijing (CN); Min-Qiang Wang, Beijing (CN); Ji-Yong Zeng, Beijing (CN)

(73) Assignees: Hon Hai Precision Industry Co. Ltd, Tu-Cheng, Taipei Hsien (TW); Tsinghua University, Beijing (CN)

( * ) Notice: Subject to any disclaimer, the term of this patent is extended or adjusted under 35 U.S.C. 154(b) by 0 days.

(21) Appl. No.: 11/018,092

(22) Filed: Dec. 20, 2004

(65) Prior Publication Data

US 2006/0056071 A1   Mar. 16, 2006

(30) Foreign Application Priority Data

Aug. 18, 2004   (CN) .................... 2004 1 0051187

(51) Int. Cl.
G02B 9/04 (2006.01)
G02B 3/02 (2006.01)

(52) U.S. Cl. ...................................... 359/793; 359/717

(58) Field of Classification Search ........ 359/793–794, 359/795, 708, 717
See application file for complete search history.

(56) References Cited

U.S. PATENT DOCUMENTS

| | | | | |
|---|---|---|---|---|
| 5,917,661 A * | 6/1999 | Tochigi et al. | ............... | 359/717 |
| 6,195,210 B1 * | 2/2001 | Tochigi | ...................... | 359/692 |
| 6,297,915 B1 | 10/2001 | Kaneko et al. | ............. | 359/718 |
| 6,449,105 B1 | 9/2002 | Dou | ........................... | 359/793 |
| 6,903,883 B2 * | 6/2005 | Amanai | ..................... | 359/819 |
| 6,927,927 B2 * | 8/2005 | Isono | ......................... | 359/793 |
| 2003/0117723 A1 | 6/2003 | Shinohara | ................... | 359/794 |
| 2003/0197953 A1 * | 10/2003 | Yamaguchi et al. | ........ | 359/717 |
| 2004/0012861 A1 | 1/2004 | Yamaguchi | .................. | 359/772 |
| 2004/0036983 A1 | 2/2004 | Ninomiya et al. | .......... | 359/719 |
| 2005/0041306 A1 * | 2/2005 | Matsuo | ....................... | 359/689 |

FOREIGN PATENT DOCUMENTS

EP   1357414 A1   10/2003
EP   1271215 A3   11/2003

* cited by examiner

Primary Examiner—Ricky Mack
Assistant Examiner—Jack Dinh
(74) Attorney, Agent, or Firm—Jeffrey T. Knapp

(57) ABSTRACT

An image pick-up lens system includes an aperture stop (10), a biconvex first lens (20), and a meniscus-shaped second lens (30) having a concave surface on a side of an object. The aperture stop, the first lens and the second lens are aligned in that order from the object side to an image side. Each of the lenses has at least one aspheric surface, and both lenses are made from a same plastic or a resin. The system satisfies the following condition: (1) 1<T/f<1.7, wherein f is a focal length of the system, and T is a length from the aperture stop to an image pick-up surface of the image side. The first condition (1) limits the total length of the system in order to provide compactness. The system also satisfies other conditions (2)–(5) as disclosed, in order to provide compactness and cost-effectiveness and to correct fundamental aberrations.

14 Claims, 12 Drawing Sheets

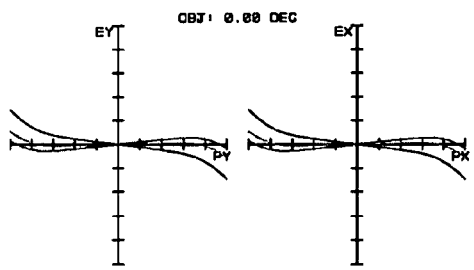
Fig. 3A
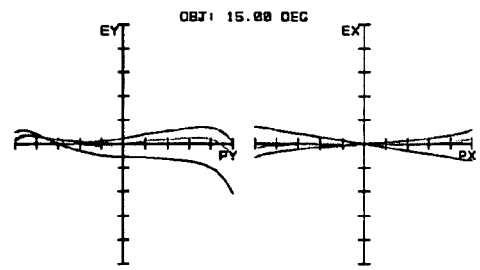
Fig. 3B
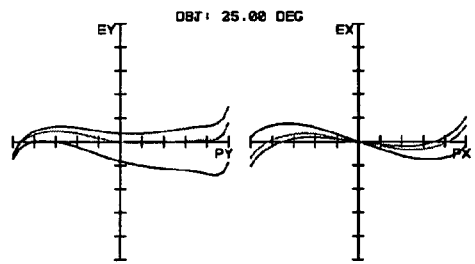
Fig. 3C
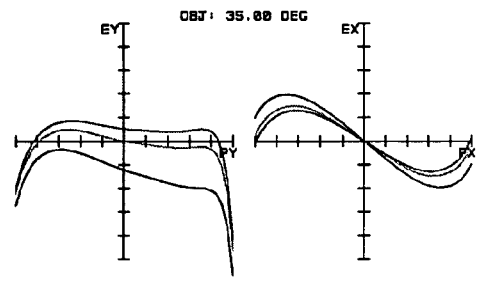
Fig. 3D
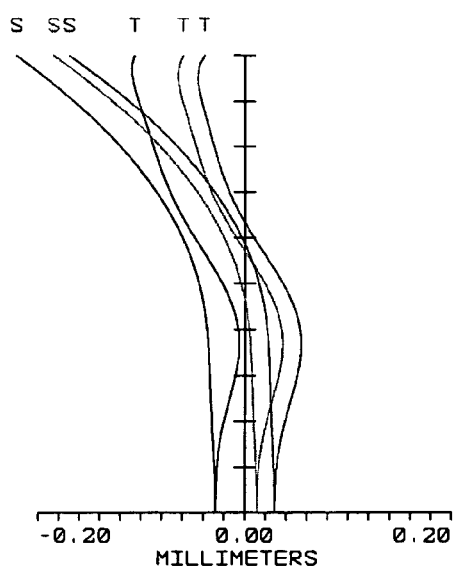
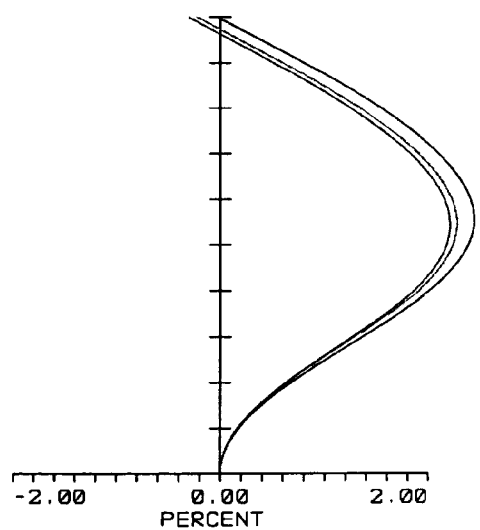

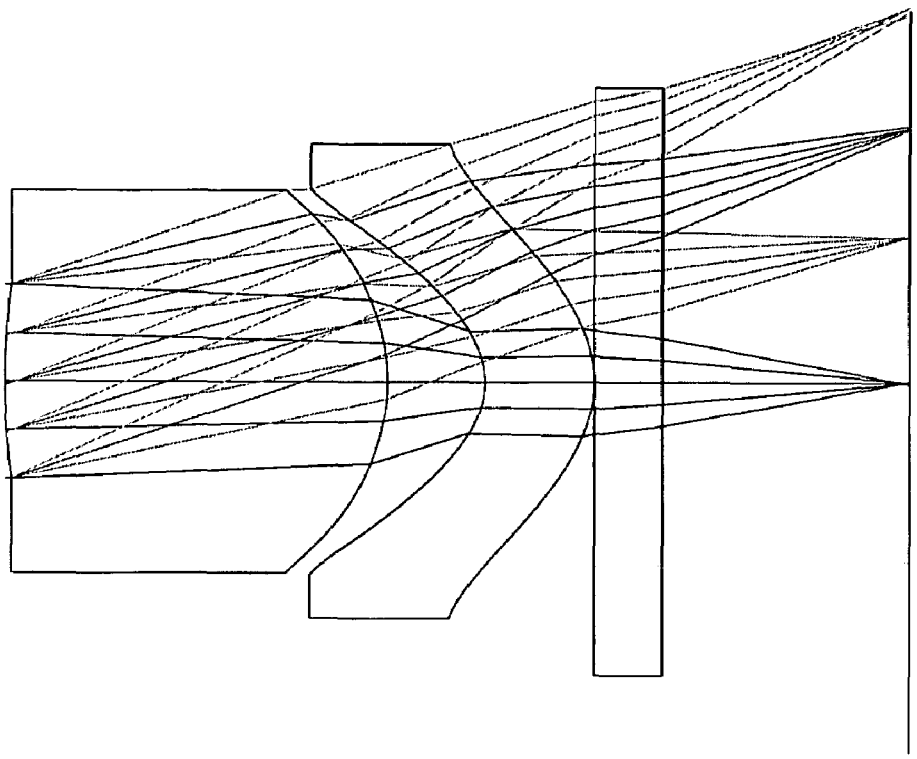
Fig. 12
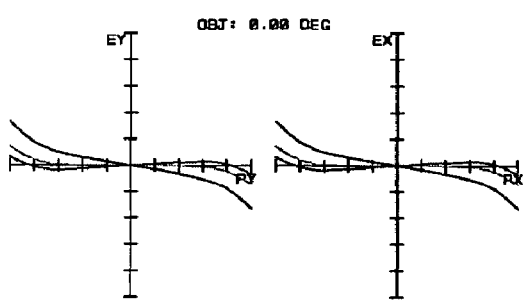 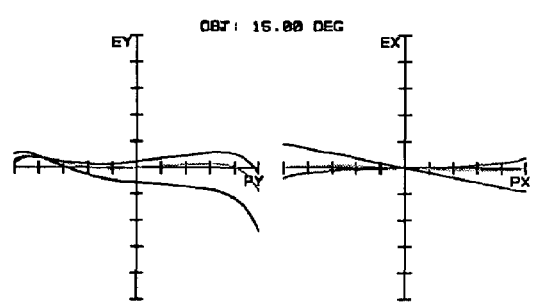
Fig. 13A    Fig. 13B

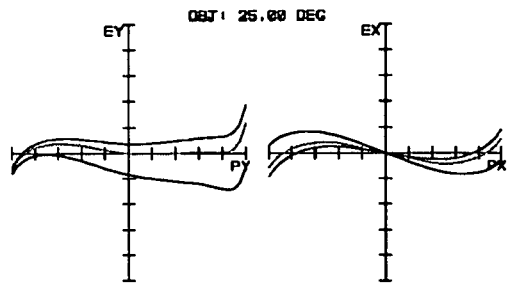
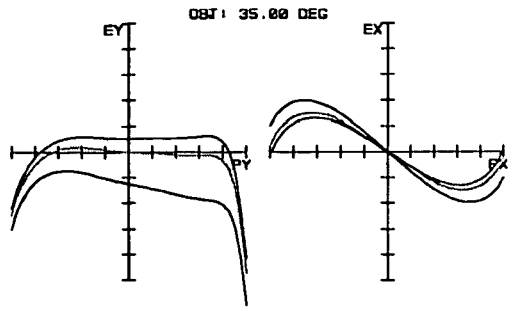
Fig. 13C  Fig. 13D
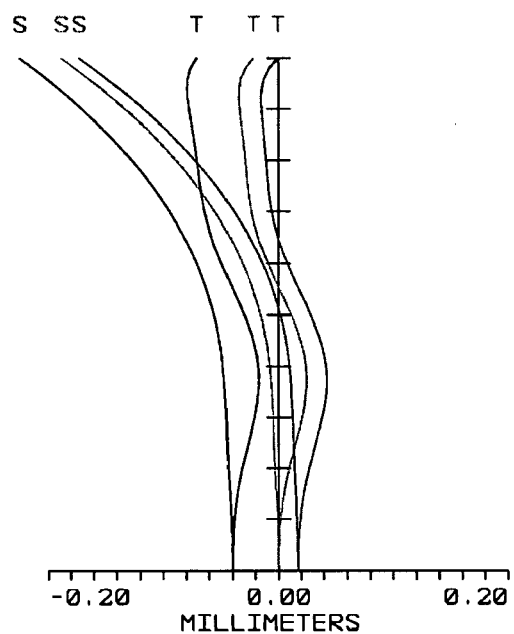
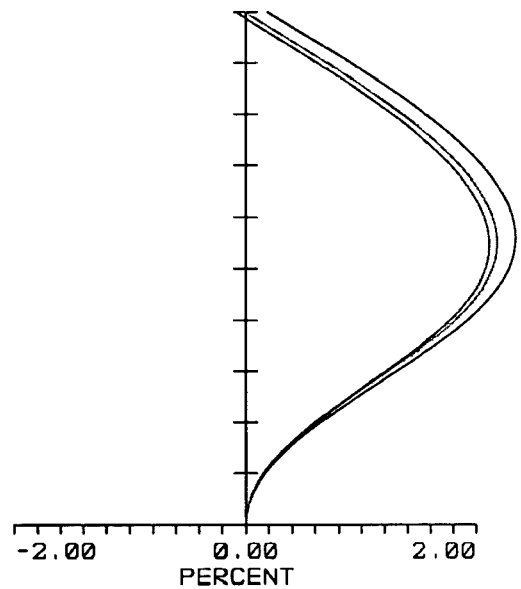
Fig. 14A  Fig. 14B

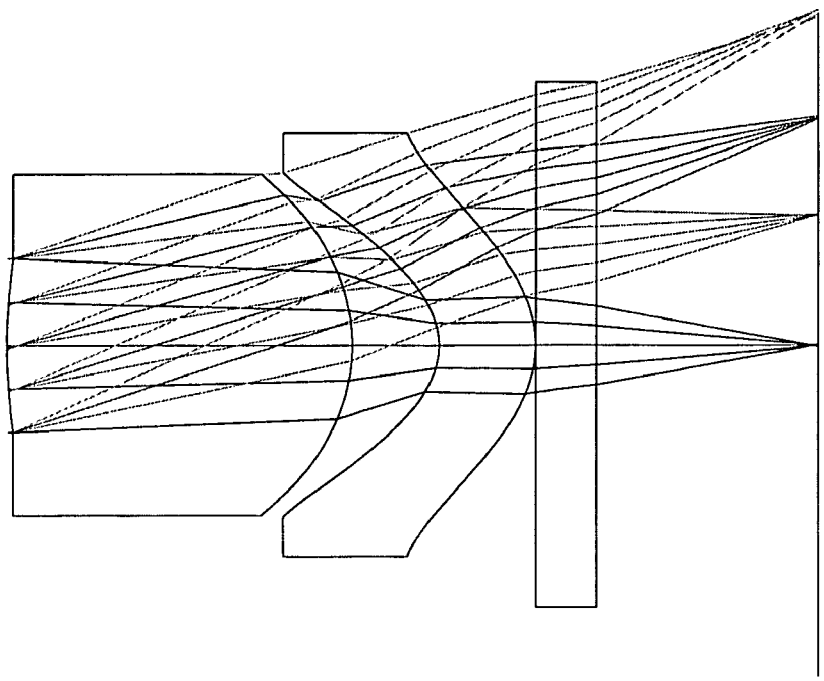
Fig. 17
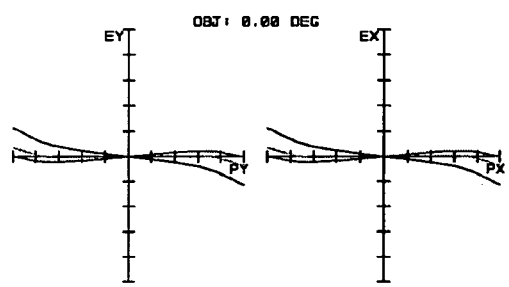 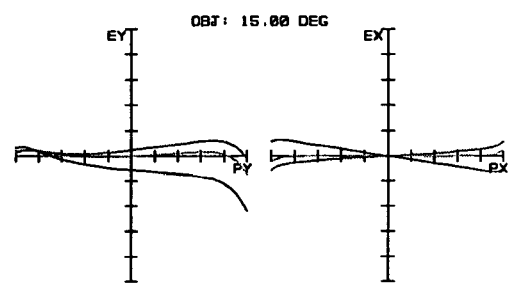
Fig. 18A     Fig. 18B
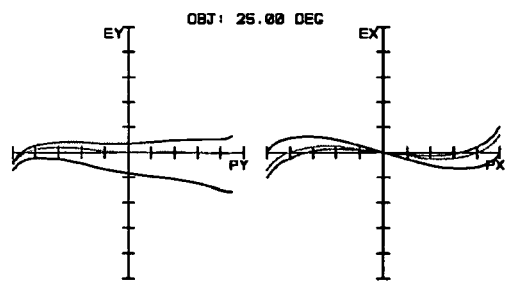 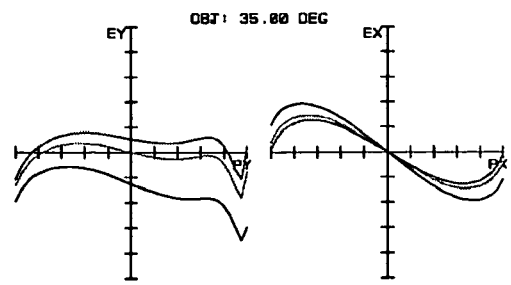

Fig. 18C
Fig. 18D
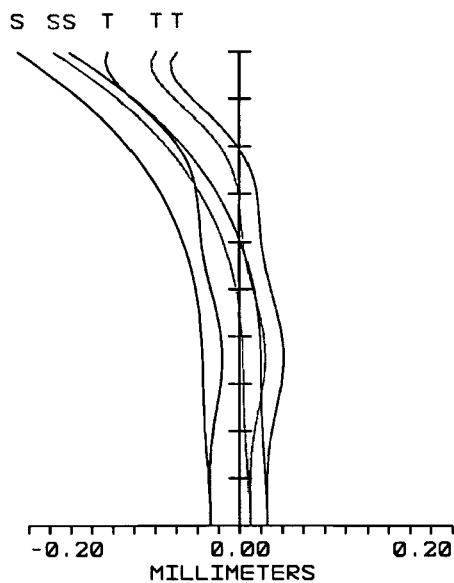
Fig. 19A
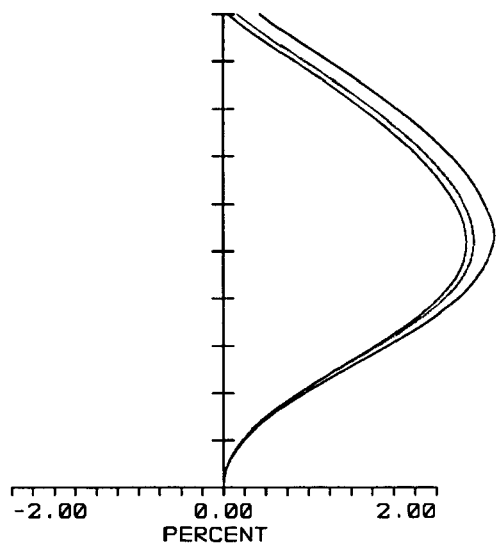
Fig. 19B
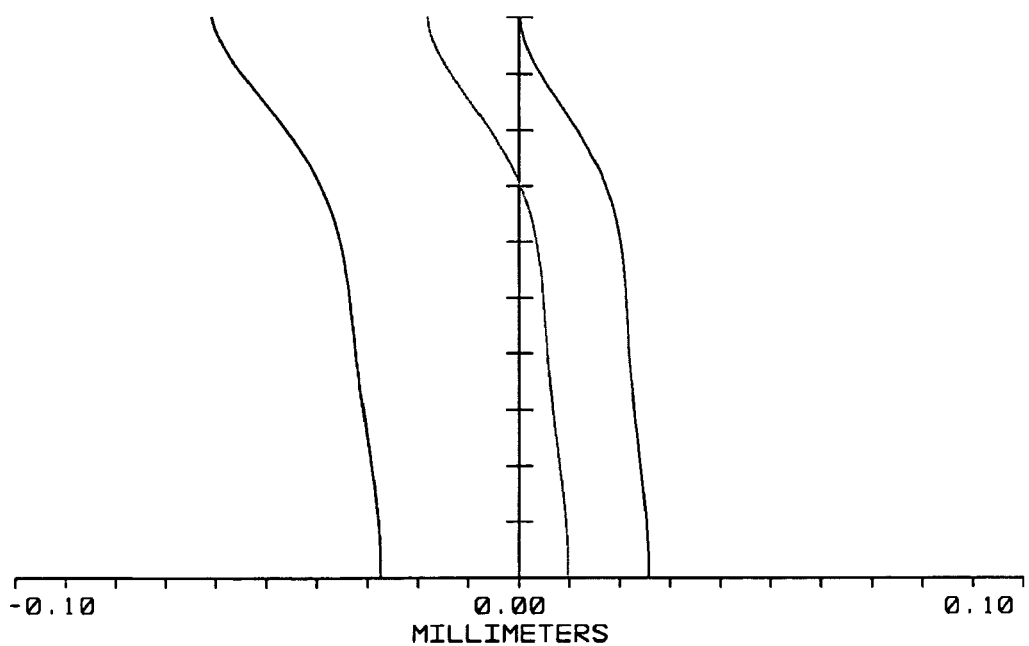
Fig. 20

IMAGE PICK-UP LENS SYSTEM

CROSS-REFERENCE TO RELATED APPLICATIONS

This application is related to two copending U.S. patent applications each entitled "IMAGE PICK-UP LENS SYSTEM," each recently filed and having the same assignee as the instant application, and having Attorney Docket Nos. 14963-46861 and 14963-47237 respectively. The disclosures of the above-identified applications are incorporated herein by reference.

TECHNICAL FIELD

The present invention relates to an image pick-up lens system which projects an image of an object onto an image pick-up surface, the image pick-up lens system being suitable for use in products such as camera modules.

BACKGROUND

In recent years, camera modules for taking photos have begun to be incorporated in mobile terminals such as mobile phones and lap-top computers. Downsizing the camera modules is a prerequisite for enhancing the portability of these apparatuses. The camera module operates with an image pickup device such as a CCD (Charged Coupled Device) or a CMOS (Complementary Metal Oxide Semiconductor). Recently, a pixel having the size of approximately a few micrometers has become commercially feasible, and an image pickup device with high resolution and a compact size can now be mass manufactured and marketed. This is accelerating the demand for downsizing of image pick-up lens systems so that they are able to be suitably used with miniaturized image pickup devices. It is also increasing expectations of cost reductions in image pick-up lens systems, commensurate with the lower costs enjoyed by modern image pickup devices. All in all, an image pick-up lens system needs to satisfy the oft-conflicting requirements of compactness, low cost, and excellent optical performance.

Compactness means in particular that a length from a lens edge of the lens system to an image pick-up surface should be as short as possible.

Low cost means in particular that the lens system should include as few lenses as possible; and that the lenses should be able to be formed from a resin or a plastic and be easily assembled.

Excellent optical performance can be classified into the following four main requirements:

First, a high brightness requirement, which means that the lens system should have a small F number (FNo.). Generally, the FNo. should be 2.8 or less.

Second, a wide angle requirement, which means that half of the field of view of the lens system should be 30° or more.

Third, a uniform illumination on the image surface requirement, which means that the lens system has few eclipses and/or narrows down an angle of incidence onto an image pick-up device.

Fourth, a high resolution requirement, which means that the lens system should appropriately correct fundamental aberrations such as spherical aberration, coma aberration, curvature of field, astigmatism, distortion, and chromatic aberration.

In a lens system which satisfies the low cost requirement, a single lens made from a resin or a plastic is desired. Typical such lens systems can be found in U.S. Pat. No. 6,297,915B1 and EP Pat. No. 1271215A2. However, even if the lens has two aspheric surfaces, it is difficult to achieve excellent optical performance, especially if a wide angle such as 70° is desired. Thus, the single lens system can generally only be used in a low-resolution image pickup device such as a CMOS. In addition, a thick lens is generally used for correcting aberrations. Thus, a ratio of a total length of the lens system to a focal length of the lens (L/f) is about 2. In other words, it is difficult to make the lens system compact.

In a lens system which satisfies the excellent optical performance requirement, three or even more lenses are desired. A typical three-lens system can be found in U.S. Pat. No. 5,940,219. A typical four-lens system can be found in U.S. Pat. Application Publication No. 2004/0012861. However, the addition of extra lenses increases costs proportionately.

In order to satisfy all the requirements of compactness, low cost and excellent optical performance, it is commonly believed that a two-lens system is desirable.

A well-known two-lens system is the retro-focus type lens system. A typical such lens system can be found in U.S. Pat. No. 6,449,105B1. The lens system comprises, from an object side to an image side, a first meniscus lens having negative refracting power and a convex surface on the object side, a stop, and a second meniscus lens having positive refracting power and a convex surface on the image side. The lens system helps correct aberrations related to wide angle of field of view. However, a shutter is positioned between the second lens and the image side, which adds to the distance between the second lens and the image side. Thus, the compactness of the lens system is limited.

In order to overcome the above described problems, an image pick-up lens system generally employs two lenses which are made from plastic or resin and which have four aspheric surfaces. A typical configuration of such system can be found in U.S. Pat. Application Publication No. 2004/0036983 and EP Pat. No. 1357414A1. The system can satisfy the compactness and low cost requirements. In addition, the system can provide a resolution of 300,000 pixels.

However, in U.S. Pat. Application Publication No. 2004/0036983, a ratio of a total length of such system to a total focal length of the lenses (L/f) is generally about 2. In addition, for correcting chromatic aberration, the Abbe constant $v1$ of a first lens of the system must satisfy the condition $v1>50$, and the Abbe constant $v2$ of a second lens of the system must satisfy the condition $v2<40$. In EP Pat. No. 1357414A1, a ratio of a total length of such system to a total focal length of the lenses is about 1.7; and such system must satisfy the condition $v1-v2>25$, wherein $v1$ is the Abbe constant of a first lens of the system and $v2$ is the Abbe constant of a second lens of the system. That is, in the two above-described systems, the smallest ratio obtainable is 1.7, which still constitutes a limitation on the compactness of the lens system. In addition, the two lenses must be made from different materials in order to correct chromatic aberration.

In one aspect, for perfectly correct chromatic aberration and to further improve optical performance, it is desirable that at least one lens of the system is made of glass. Glass is more expensive than other materials such as plastics or resins. Thus manufacturing costs are increased. In another aspect, molding is necessary for mass manufacturing of aspheric surfaces of the lenses. The different materials that need to be molded require different technical parameters to be applied during the molding process. This complicates the molding processes, and increases manufacturing costs. Further, plastic and resin materials are prone to absorb water. For example, the water absorbency of polymethyl methacrylate (PMMA) is 1.5%, and the water absorbency value of polycarbonate (PC) is 0.4%. Among the plastic or resin materials which can be suitably used to make lenses, only zeonex materials (polyolefin resins or cyclo-olefin polymers) have relatively low water absorbency. These water absorbencies are less than 0.01%. Zeonex materials are available from the Japanese Zeon Corporation. Therefore unless the non-glass lens is made from a zeonex material, it is liable to absorb water and deform. As a result, the optical performance of the system is diminished.

On the other hand, a CMOS having a resolution of 300,000 pixels requires relatively low optical performance from an image pick-up lens system. There is a need for a relatively low optical performance lens system which can satisfy the requirements of a CMOS having a resolution of 300,000 pixels. Because the optical performance and resolution are relatively low, the cost of such lens system needs to be commensurately low.

In summary, a low cost image pick-up lens system which has a compact configuration and which can be used in products having 300,000 pixels resolution is desired.

SUMMARY OF THE INVENTION

Accordingly, an object of the present invention is to provide an image pick-up lens system which is cost-effective.

Another object of the present invention is to provide an image pick-up lens system which has a relatively short total length.

A further object of the present invention is to provide an image pick-up lens system which can optimally correct fundamental aberrations.

In the range of optical performance required for a CMOS having a resolution of 300,000 pixels, chromatic aberration has little effect on the optical performance. Further, if the focal length of the lens system is short, such as 4 millimeters, the effect of chromatic aberration need not be considered when designing the lens system. Accordingly, a relatively short image pick-up lens system not employing glass lenses is provided by the present invention.

To achieve the above-described objects, an image pick-up lens system in accordance with the present invention comprises an aperture stop, a biconvex first lens, and a meniscus-shaped second lens having a concave surface on a side of an object. The aperture stop, the first lens and the second lens are aligned in that order from the object side to an image side. The first and the second lenses each have at least one aspheric surface. Both the first and second lenses are made from a same plastic or a same resin.

According to a first aspect, the following condition is satisfied:

$$1.0 < T/f < 1.7, \qquad (1)$$

wherein, f is a focal length of the system, and T is a length from the aperture stop to an image pick-up surface of the image side.

According to a second aspect, preferably, the following conditions are satisfied:

$$0.5 < f1/f < 0.8, \text{ and} \qquad (2)$$

$$0.2 < R2/R1 < 1.0, \qquad (3)$$

wherein, f1 is a focal length of the first lens, f is the focal length of the system, R1 is an absolute value of a radius of curvature of a first surface of the first lens on the object side and R2 is an absolute value of a radius of curvature of a second surface of the first lens on the image side.

According to a third aspect, the following condition is satisfied:

$$1.2 < d/R2 < 2.1, \qquad (4)$$

wherein, d is a thickness of the first lens and R2 is the absolute value of the radius of curvature of the second surface of the first lens.

Further, to correct field curvature, the following condition is satisfied:

$$0.7 < (1/R3)/(1/R1 + 1/R2 + 1/R4) < 1.0 \qquad (5)$$

wherein, R1 is the absolute value of the radius of curvature of the first surface of the first lens, R2 is the absolute value of the radius of curvature of the second surface of the first lens, R3 is an absolute value of a radius of curvature of a third surface of the second lens on the object side, and R4 is an absolute value of a radius of curvature of a fourth surface of the second lens on the image side.

Further still, preferably, the same plastic or the same resin is a zeonex material or an equivalent material having low water absorbency.

Because the first lens is positioned adjacent the aperture stop and has at least one aspheric surface, the image pick-up lens system can appropriately correct spherical and coma aberrations. In addition, because the second lens is positioned away from the aperture stop and has at least one aspheric surface, different chief rays of different field angles can have very different corresponding projection heights at the second lens. Therefore, the system can appropriately correct astigmatism, field curvature and distortion, all of which are related to the field angle. Furthermore, the fourth surface of the second lens has gradually varying refraction from a central portion thereof near an optical axis of the system to a peripheral edge portion thereof. Thus, the central portion of the second lens diverges light rays and the peripheral edge portion of the second lens converges light rays, so that the meridional/sagittal sections easily coincide. For all the above reasons, the optical image performance in wide angles of the system is enhanced. Furthermore, because the first and second lenses are made from a same plastic or a same resin, the manufacture cost is reduced. Moreover, because the zeonex material is employed to make the lenses, reduction of the optical performance of the lens system due to deformation of the lenses caused by water absorbency is prevented.

Other objects, advantages and novel features of the present invention will become more apparent from the following detailed description when taken in conjunction with the accompanying drawings, in which:

BRIEF DESCRIPTION OF THE DRAWINGS

FIGS. 3–6 are graphs respectively showing transverse ray fan plots, and field curvature and distortion, longitudinal spherical aberration, and lateral chromatic aberration curves for the system in accordance with the first exemplary embodiment of the present invention;

FIG. 12 is a schematic, cross-sectional view of a third exemplary embodiment of the image pick-up lens system in accordance with the present invention, and also showing an image pick-up surface and essential optical paths;

FIGS. 13–16 are graphs respectively showing transverse ray fan plots, and field curvature and distortion, longitudinal spherical aberration, and lateral chromatic aberration curves for the system in accordance with the third exemplary embodiment of the present invention;

FIG. 17 is a schematic, cross-sectional view of a fourth exemplary embodiment of the image pick-up lens system in accordance with the present invention, and also showing an image pick-up surface and essential optical paths; and FIGS. 18–21 are graphs respectively showing transverse ray fan plots, and field curvature and distortion, longitudinal spherical aberration, and lateral chromatic aberration curves of the system in accordance with the fourth exemplary embodiment of the present invention.

DETAILED DESCRIPTION OF EXEMPLARY EMBODIMENTS OF THE INVENTION

Figure 1:
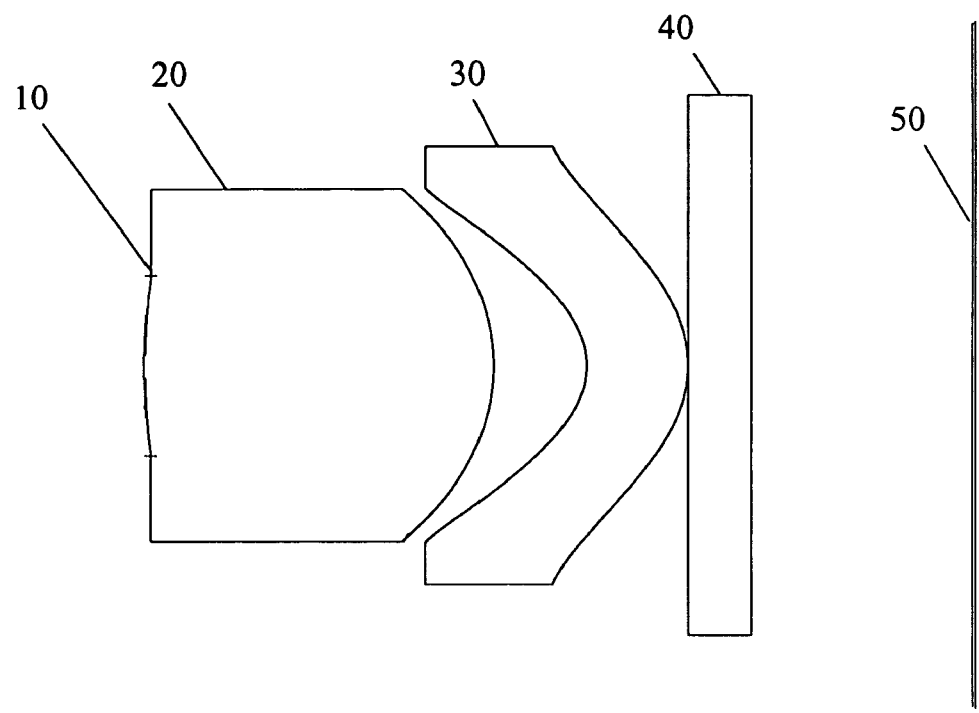
FIG. 1 is a schematic, cross-sectional view of an image pick-up lens system in accordance with the present invention, and also showing an image pick-up surface.

FIG. 1 shows a schematic configuration of an image pick-up lens system in accordance with the present invention. The image pick-up lens system comprises an aperture stop 10, a biconvex first lens 20, and a meniscus-shaped second lens 30 having a concave surface on an object side. The aperture stop 10, the first lens 20 and the second lens 30 are aligned in that order from the object side to an image side. The first and the second lenses 20, 30 each have at least one aspheric surface. Both the first and second lenses 20, 30 are made from a same plastic or a same resin.

The aperture stop 10 is arranged closest to the object in order to narrow down an incident angle of chief rays onto an image pick-up surface 50 located at the image side. In addition, this arrangement of the aperture stop 10 helps shorten a total length of the system. For further cost reduction, the aperture stop 10 is preferably formed directly on a first surface (not labeled) of the first lens 20 on the object side. In practice, a portion of the first surface of the first lens 20 through which light rays are not transmitted is coated with a black material, which functions as the aperture stop 10.

In order to provide compactness and excellent optical performance, the system satisfies the following condition:

$$1.0 < T/f < 1.7, \qquad (1)$$

wherein, f is a focal length of the system, and T is a length from the aperture stop 10 to the image pick-up surface 50. The first condition (1) is for limiting the total length of the system. The total length of the system is directly related to optical performance of the system, especially when controlling the incident angle of the chief rays in order to achieve an approximate image side telecentric characteristic light path. With such light path, the system can improve optical performance as well as achieve compactness.

Preferably, both the first surface and a second surface (not labeled) of the first lens 20 on the image side are aspheric, and the following conditions are satisfied:

$$0.5 < f1/f < 0.8, \text{ and} \qquad (2)$$

$$0.2 < R2/R1 < 1.0, \qquad (3)$$

wherein, f1 is a focal length of the first lens 20, f is the focal length of the system, R1 is an absolute value of a radius of curvature of the first surface of the first lens 20, and R2 is an absolute value of a radius of curvature of the second surface of the first lens 20. The second condition (2) is for correcting monochromatic aberrations, and providing both compactness and a desirable distribution of refracting power. In one aspect, when the ratio f1/f is above the lower limit of 0.5, the system provides satisfactory total refracting power and keeps the high-order spherical aberration, high-order coma and lateral chromatic aberration of the system in a controlled range. In another aspect, when the ratio f1/f is below the upper limit of 0.8, the system is compact and provides satisfactory total refracting power. The third condition (3) governs a distribution of refracting power for the first lens 20, in order to correct monochromatic aberrations.

In addition, the first lens 20 preferably satisfies the following condition:

$$1.2 < d/R2 < 2.1, \qquad (4)$$

wherein, d is a thickness of the first lens 20 at its optical axis, and R2 is the absolute value of the radius of curvature of the second surface of the first lens 20. The fourth condition (4) is for lessening an incident angle of the chief rays on the second surface of the first lens 20 in order to lessen high-order aberrations.

The concave surface of the second lens 30 is defined as a third surface (not labeled), and the convex surface of the second lens 30 is defined as a fourth surface (not labeled). Preferably, the second lens 30 is aspheric at both the third and fourth surfaces thereof. The first lens 20 and the second lens 30 satisfy the following condition:

$$0.7 < (1/R3)/(1/R1 + 1/R2 + 1/R4) < 1.0, \qquad (5)$$

wherein, R1 is the absolute value of the radius of curvature of the first surface of the first lens 20, R2 is the absolute value of the radius of curvature of the second surface of the first lens 20, R3 is an absolute value of a radius of curvature of the third surface of the second lens 30, and R4 is an absolute value of a radius of curvature of the fourth surface of the second lens 30.

The fifth condition (5) is for correcting field curvature and obtaining a flat field. In one aspect, when the ratio (1/R3)/(1/R1+1/R2+1/R4) is above the lower limit of 0.7, the negative Petzval's Sum produced by the third surface of the second lens 30 can compensate the total positive Petzval's Sum produced by the first and second surfaces of the first lens 20 and the fourth surface of the second lens 30. Thus, it is relatively easy to correct field curvature of the system. In another aspect, when the ratio (1/R3)/(1/R1+1/R2+1/R4) is below the upper limit of 1.0, the negative refracting power produced by the third surface of the second lens 30 can effectively compensate and correct the positive coma and lateral chromatic aberrations produced by the first lens 20. In addition, the radius of curvature R3 of the third surface of the second lens 30 is not so small as to increase the high-order aberrations of the system. Furthermore, the radius of curvature R3 of the third surface of the second lens 30 has the smallest absolute value among the four absolute values of radiuses of curvature R1, R2, R3, R4 of the first and second lenses 20, 30. Thus, in order to correct field curvature without producing high-order aberrations, the third surface of the second lens 30 is concave relative to the aperture stop 10.

Also, in order to simplify the required manufacturing technology and reduce manufacturing costs, the first lens 20 and the second lens 30 are made from a same plastic or a same resin. Preferably, the first lens 20 and the second lens 30 are made from a zeonex material or an equivalent material having low water absorbency.

Further, the fourth surface of the second lens 30 preferably has a gradually varying refraction characteristic from a central portion thereof near an optical axis of the system to a peripheral edge portion thereof. Thus, a central portion of the second lens 30 diverges light rays and a peripheral edge portion of the second lens 30 converges light rays, so that meridional/sagittal sections easily coincide. This feature further enhances the optical image performance in wide angles of the system.

The above explanations outline fundamental constituent features of the present invention. Examples of the image pick-up lens system will be described below with reference to FIGS. 2–21. It is to be understood that the invention is not limited to these examples. The following are symbols used in each exemplary embodiment.

T: length from the aperture stop 10 to the image pick-up surface 50 f: focal length of the system

FNo: F number

ω: half field angle

2ω: field angle

θ: incident angle of chief rays

R: radius of curvature d: distance between surfaces on the optical axis of the system Nd: refractive index of lens ν: Abbe constant In each example, the first and second surfaces of the first lens 20 and the third and fourth surfaces of the second lens 30 are all aspheric. A cover glass 40 is provided between the second lens 30 and the image pick-up surface 50. The first lens 20 and the second lens 30 are made from the E48R type of zeonex material, which is available from the Japanese Zeon Corporation. The shape of each aspheric surface is provided by expression 1 below. Expression 1 is based on a Cartesian coordinate system, with the vertex of the surface being the origin, and the optical axis extending from the vertex being the x-axis.

Expression 1:

$$x = \frac{ch^2}{1 + \sqrt{1 - (k+1)c^2 h^2}} + \sum A_i h^i$$

where, h is a height from the optical axis to the surface, c is a vertex curvature, k is a conic constant, and $A_i$ are i-th order correction coefficients of the aspheric surface.

EXAMPLE 1

Figure 2:
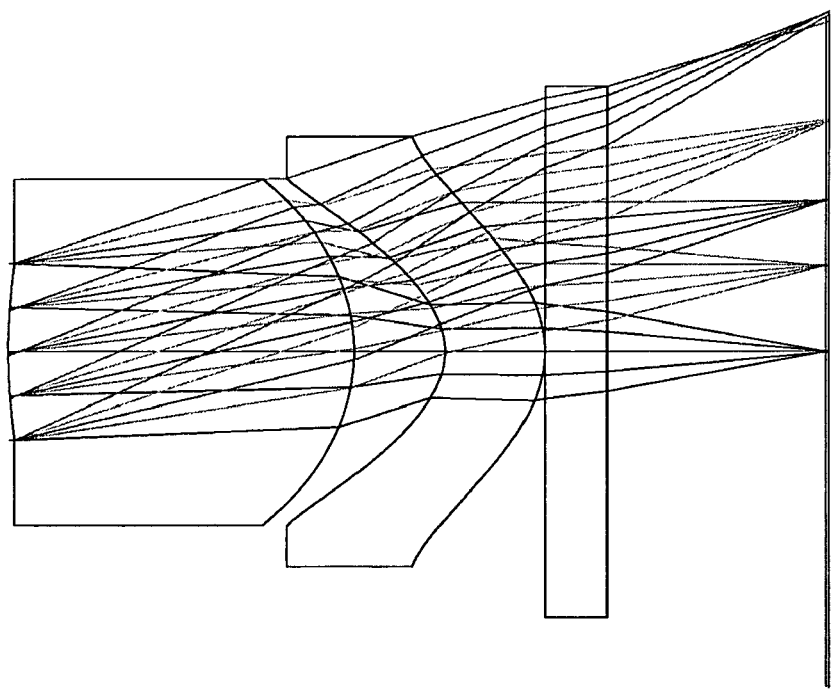
FIG. 2 is a schematic, cross-sectional view of a first exemplary embodiment of the image pick-up system in accordance with the present invention, and also showing an image pick-up surface and essential optical paths.
Figures 4A, 4B, 5:
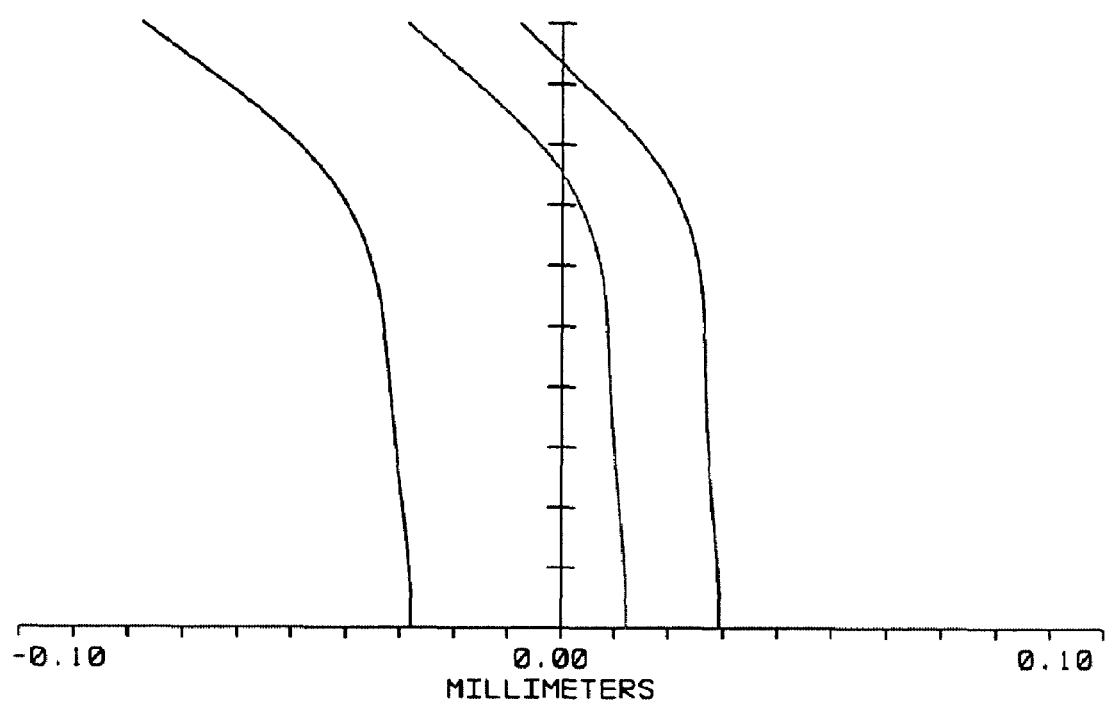
Figure 6:
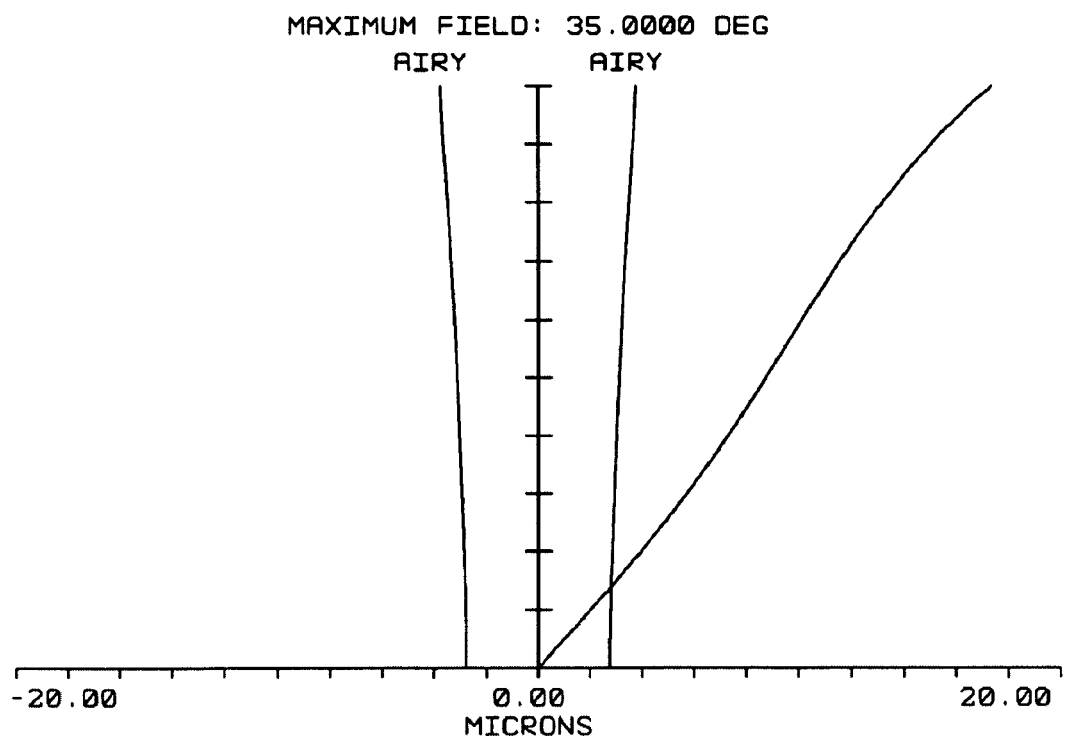

FIG. 2 shows essential optical paths of the image pick-up lens system of the first exemplary embodiment of the present invention.

Tables 1 and 2 show lens data of Example 1.

TABLE 1 f = 3.19 mm T = 5.30 mm FNo = 2.73 ω = 35° θ = 24°

| Surface | R (mm) | d (mm) | Nd | ν | k |
|---|---|---|---|---|---|
| Stop 10 | infinite | −0.04 | | | 0 |
| 1st | 3.873298 | 2.235899 | 1.531170 | 56.0 | 1.616978 |
| 2nd | −1.211043 | 0.5899513 | | | −0.487073 |
| 3rd | −0.5020784 | 0.6450393 | 1.531170 | 56.0 | −0.8490884 |
| 4th | −0.7726022 | | | | −1.010072 |

TABLE 2

| Surface | 1st | 2nd | 3rd | 4th |
|---|---|---|---|---|
| Aspheric coefficient | A2 = 0<br>A4 = −0.020331491<br>A6 = −0.096103382<br>A8 = 0.27335075<br>A10 = −0.48215993<br>A12 = 0.21645868<br>A14 = 0<br>A16 = 0 | A2 = 0<br>A4 = 0.054883735<br>A6 = −0.11869052<br>A8 = 0.18250629<br>A10 = −0.17892911<br>A12 = 0.068528162<br>A14 = 0<br>A16 = 0 | A2 = 0<br>A4 = 0.24449449<br>A6 = 0.14631033<br>A8 = 0.0094700534<br>A10 = −0.13212329<br>A12 = 0.095021776<br>A14 = 0<br>A16 = 0 | A2 = 0<br>A4 = 0.038896607<br>A6 = 0.065311338<br>A8 = −0.017325837<br>A10 = −0.0034188058<br>A12 = 0.0020368793<br>A14 = 0<br>A16 = 0 |

FIGS. 3–6 are graphs of aberrations (transverse ray fan plots, and field curvature/distortion, longitudinal spherical aberration and lateral chromatic aberration curves) of the image pick-up lens system of Example 1. FIGS. 3A–3D respectively show aberrations curves of meridional/sagittal sections in 0°, 15°, 25° and 35° field angles. FIGS. 4A and 4B respectively show field curvature and distortion curves.

EXAMPLE 2

Figure 7:
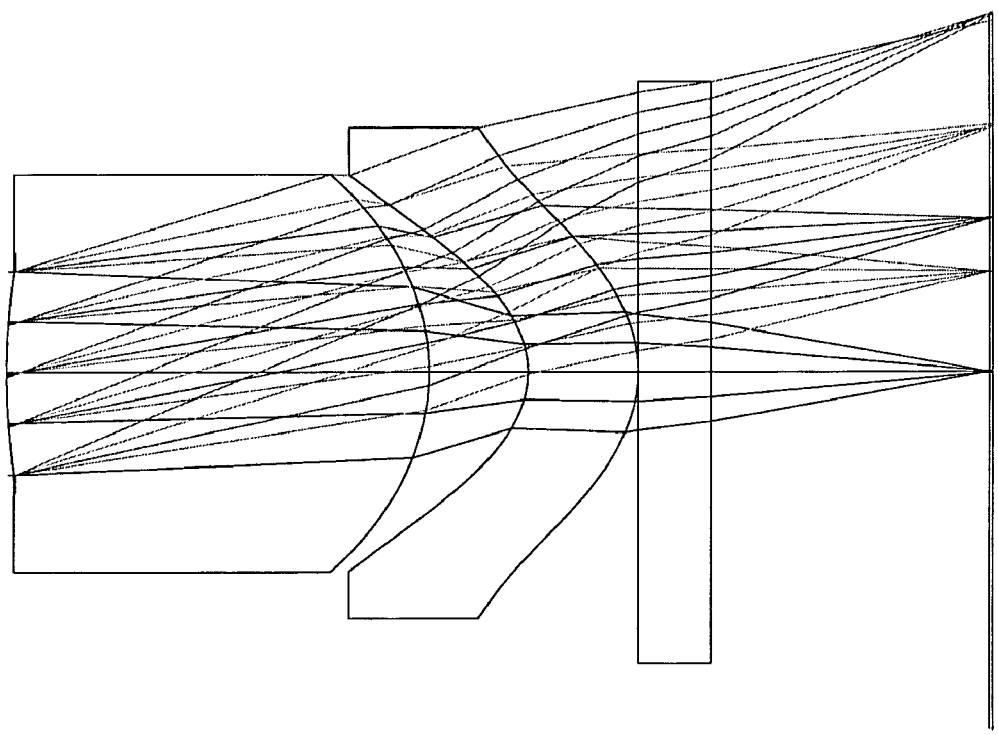
FIG. 7 is a schematic, cross-sectional view of a second exemplary embodiment of the image pick-up lens system in accordance with the present invention, and also showing an image pick-up surface and essential optical paths.
Figure 8A:
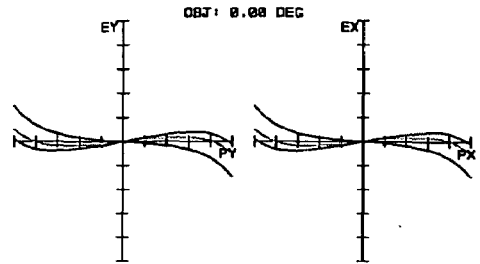
FIGS. 8–11 are graphs respectively showing transverse ray fan plots, and field curvature and distortion, longitudinal spherical aberration, and lateral chromatic aberration curves for the system in accordance with the second exemplary embodiment of the present invention.
Figure 8B:
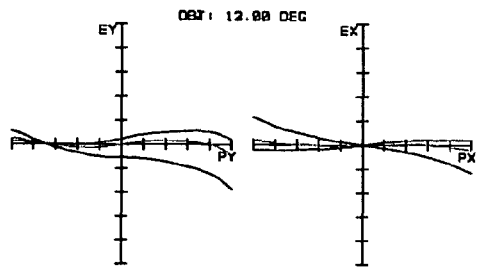
Figure 8C:
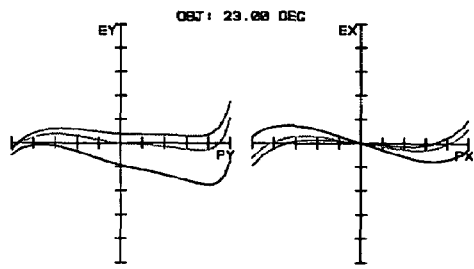
Figure 8D:
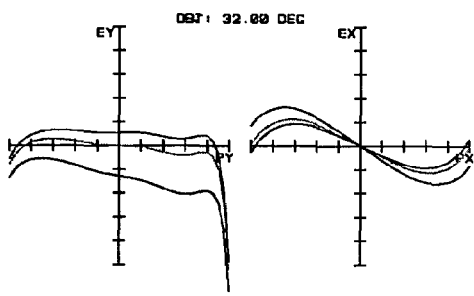
Figure 9A:
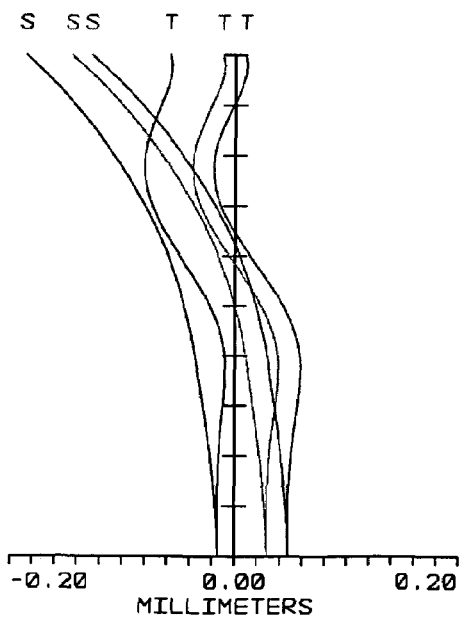
Figure 9B:
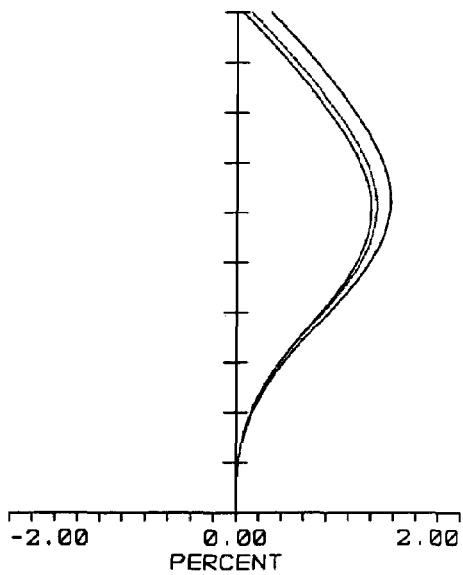
Figure 10:
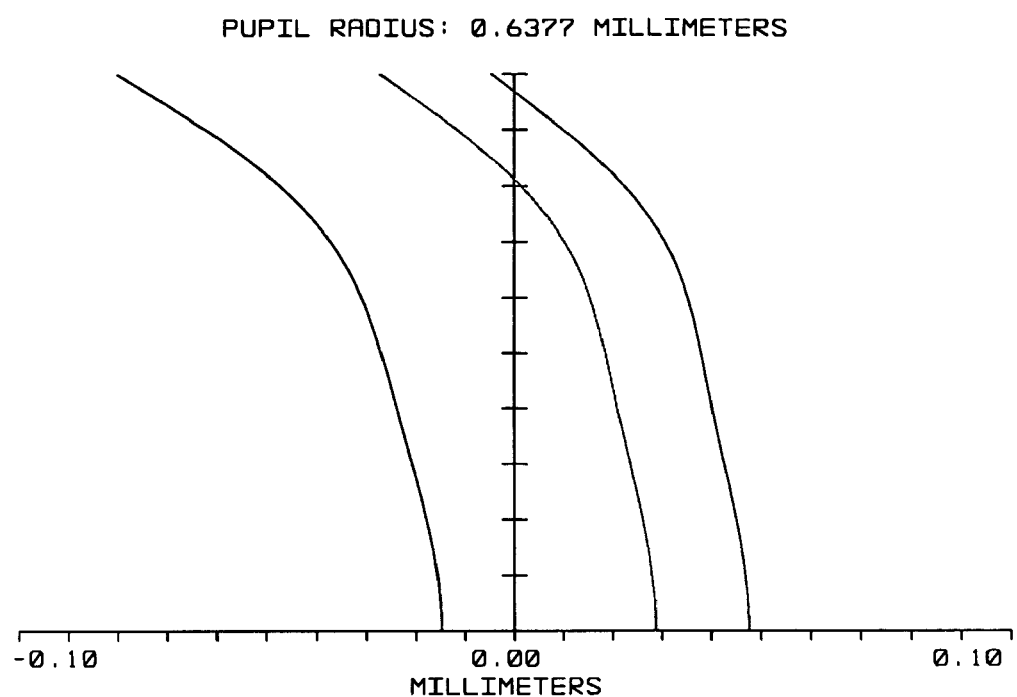
Figure 11:
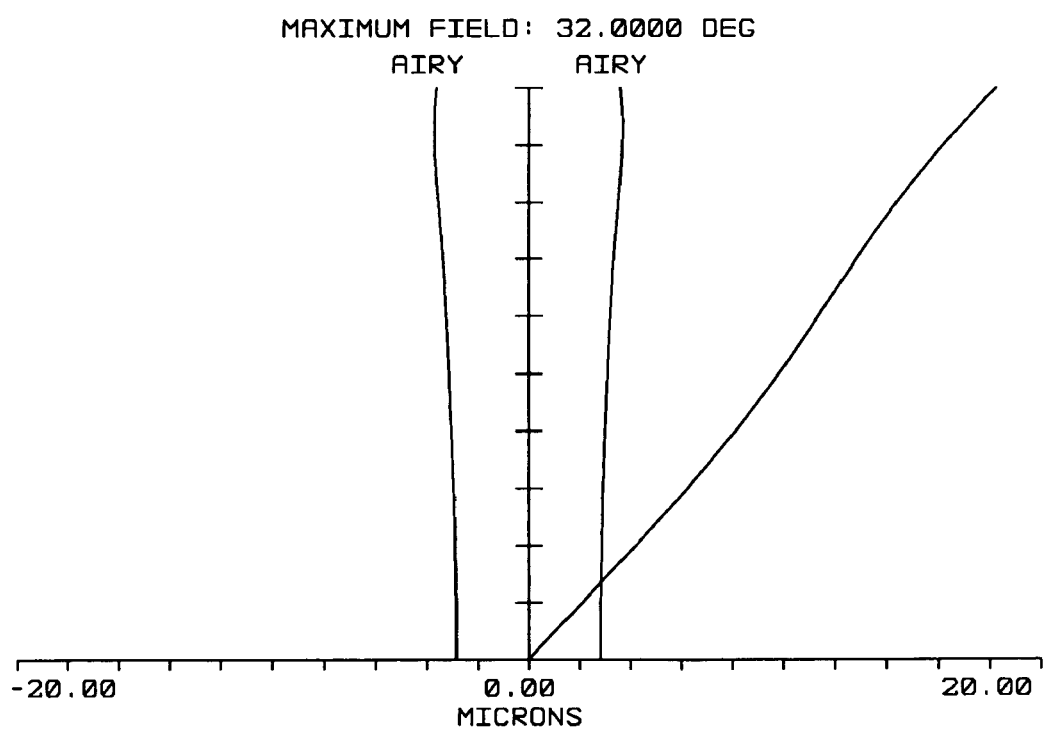
Figure 15:
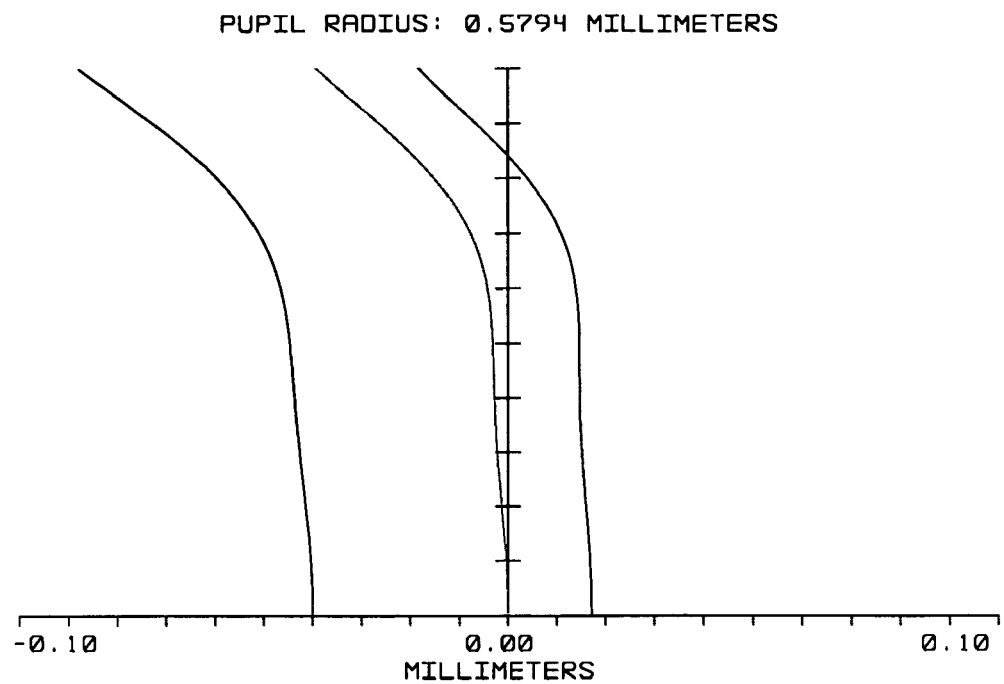
Figure 16:
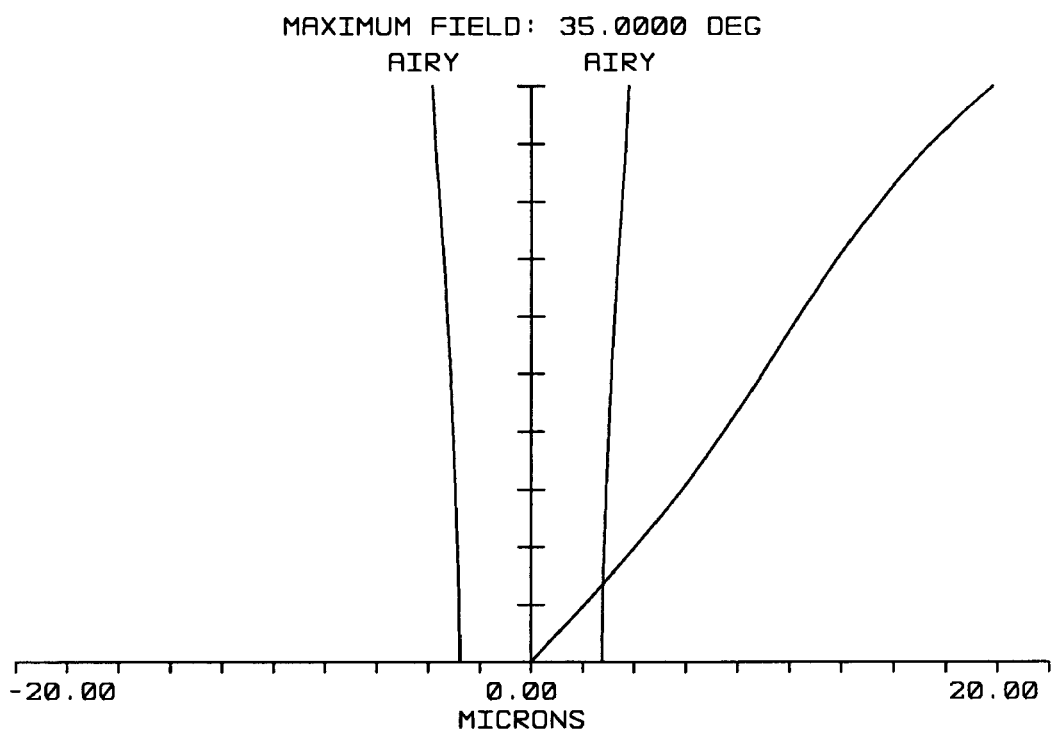
Figure 21:
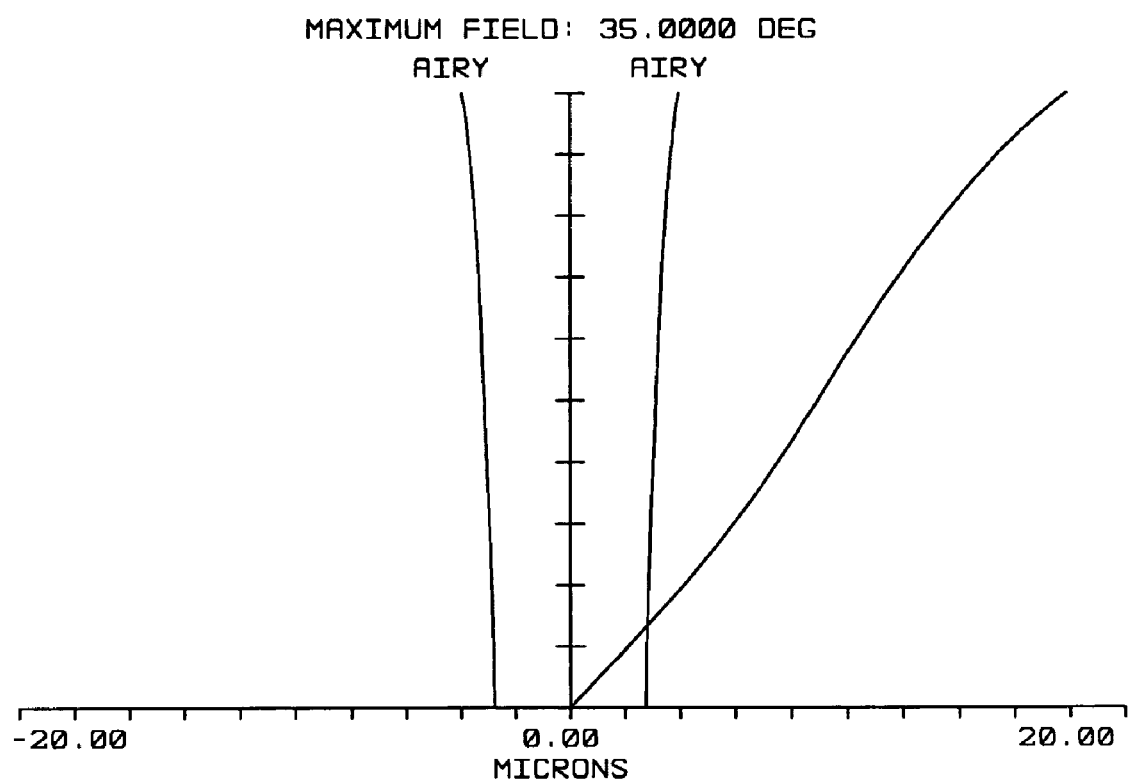

FIG. 7 shows essential optical paths of a configuration of the image pick-up lens system of the second exemplary embodiment of the present invention.

Lens data of Example 2 are shown in tables 3 and 4.

TABLE 3 f = 3.60 mm T = 6.08 mm FNo = 2.80 ω = 32° θ = 20.5°

| Surface | R (mm) | d (mm) | Nd | ν | k |
|---|---|---|---|---|---|
| Stop 10 | infinite | −0.05 | | | 0 |
| 1st | 4.447843 | 2.601717 | 1.531170 | 56.0 | 15.17709 |
| 2nd | −1.447105 | 0.616839 | | | 0.1157404 |

TABLE 3-continued f = 3.60 mm T = 6.08 mm FNo = 2.80 ω = 32° θ = 20.5°

| Surface | R (mm) | d (mm) | Nd | ν | k |
|---|---|---|---|---|---|
| 3rd | −0.6089014 | 0.6834876 | 1.531170 | 56.0 | −0.8374973 |
| 4th | −0.8920453 | 0 | | | −0.855432 |

TABLE 4

| Surface | 1st | 2nd | 3rd | 4th |
|---|---|---|---|---|
| Aspheric coefficient | A2 = 0 | A2 = 0 | A2 = 0 | A2 = 0 |
| | A4 = −0.028996122 | A4 = 0.0287513 | A4 = −0.042975259 | A4 = −0.0090630946 |
| | A6 = −0.062444185 | A6 = −0.026742736 | A6 = 0.22000479 | A6 = 0.05108427 |
| | A8 = 0.11722312 | A8 = 0.074842416 | A8 = 0.012006078 | A8 = 0.0028420763 |
| | A10 = −0.16219682 | A10 = −0.063843901 | A10 = −0.064163463 | A10 = −0.0020448173 |
| | A12 = 0.057158661 | A12 = 0.022604546 | A12 = 0.021116254 | A12 = −0.00028684316 |
| | A14 = 0 | A14 = 0 | A14 = 0 | A14 = 0 |
| | A16 = 0 | A16 = 0 | A16 = 0 | A16 = 0 |

FIGS. 8–11 are graphs of aberrations (transverse ray fan plots, and field curvature/distortion, longitudinal spherical aberration and lateral chromatic aberration curves) of the image pick-up lens system of Example 2. FIGS. 8A–8D respectively show aberrations curves of meridional/sagittal sections in 0°, 12°, 23° and 32° field angles. FIGS. 9A and 9B respectively show field curvature and distortion curves.

EXAMPLE 3

FIG. 12 shows essential optical paths of a configuration of the image pick-up lens system of the third exemplary embodiment of the present invention.

Lens data of Example 3 are shown in tables 5 and 6.

TABLE 5 f = 3.19 mm T = 5.32 mm FNo = 2.73 ω = 35° θ = 24°

| Surface | R (mm) | d (mm) | Nd | ν | k |
|---|---|---|---|---|---|
| Stop 10 | infinite | −0.04 | | | 0 |
| 1st | 3.860457 | 2.259999 | 1.531170 | 56.0 | 1.661424 |
| 2nd | −1.201867 | 0.57734 | | | −0.49085 |
| 3rd | −0.5020861 | 0.6386391 | 1.531170 | 56.0 | −0.8484026 |
| 4th | −0.7747951 | 0 | | | −1.009243 |

FIGS. 13–16 are graphs of aberrations (transverse ray fan plots, and field curvature/distortion, longitudinal spherical aberration and lateral chromatic aberration curves) of the image pick-up lens system of Example 3. FIGS. 13A–13D respectively show aberrations curves of meridional/sagittal sections in 0°, 15°, 25° and 35° field angles. FIGS. 14A and 14B respectively show field curvature and distortion curves.

EXAMPLE 4

FIG. 17 shows essential optical paths of a configuration of the image pick-up lens system of the fourth exemplary embodiment of the present invention.

Lens data of Example 4 are shown in tables 7 and 8.

TABLE 7 f = 3.19 mm T = 5.33 mm FNo = 2.74 ω = 35° θ = 24°

| Surface | R (mm) | d (mm) | Nd | ν | k |
|---|---|---|---|---|---|
| Stop 10 | infinite | −0.04 | | | 0 |
| 1st | 3.354236 | 2.585222 | 1.531170 | 56.0 | 5.044899 |
| 2nd | −1.33215 | 0.6783699 | | | −0.3833156 |
| 3rd | −0.4634305 | 0.5375243 | 1.531170 | 56.0 | −0.8827851 |
| 4th | −0.6635433 | 0 | | | −0.9841699 |

TABLE 6

| Surface | 1st | 2nd | 3rd | 4th |
|---|---|---|---|---|
| Aspheric coefficient | A2 = 0 | A2 = 0 | A2 = 0 | A2 = 0 |
| | A4 = −0.020539629 | A4 = 0.05529676 | A4 = 0.24531714 | A4 = 0.03870268 |
| | A6 = −0.095480243 | A6 = −0.1171058 | A6 = 0.1456802 | A6 = 0.065391891 |
| | A8 = 0.27353815 | A8 = 0.18067966 | A8 = 0.0089229626 | A8 = −0.0171414 |
| | A10 = −0.48215993 | A10 = −0.1794137 | A10 = −0.12527853 | A10 = −0.0028867735 |
| | A12 = 0.21645868 | A12 = 0.069909642 | A12 = 0.092041399 | A12 = 0.0018271953 |
| | A14 = 0 | A14 = 0 | A14 = 0 | A14 = 0 |
| | A16 = 0 | A16 = 0 | A16 = 0 | A16 = 0 |

TABLE 8

| Surface | 1st | 2nd | 3rd | 4th |
|---|---|---|---|---|
| Aspheric coefficient | A2 = 0 | A2 = 0 | A2 = 0 | A2 = 0 |
| | A4 = −0.026115409 | A4 = 0.054536599 | A4 = 0.19929286 | A4 = 0.035013661 |
| | A6 = −0.087614029 | A6 = −0.11678381 | A6 = 0.16747147 | A6 = 0.081762484 |
| | A8 = 0.27353815 | A8 = 0.17018112 | A8 = 0.022160047 | A8 = −0.017530143 |
| | A10 = −0.48215993 | A10 = −0.16147834 | A10 = −0.11866401 | A10 = −0.0020766261 |
| | A12 = 0.21645868 | A12 = 0.057184301 | A12 = 0.069253332 | A12 = 0.0011492576 |
| | A14 = 0 | A14 = 0 | A14 = 0 | A14 = 0 |
| | A16 = 0 | A16 = 0 | A16 = 0 | A16 = 0 |

FIGS. 18–21 are graphs of aberrations (transverse ray fan plots, and field curvature/distortion, longitudinal spherical aberration and lateral chromatic aberration curves) of the image pick-up lens system of Example 4. FIGS. 18A–18D respectively show aberrations curves of meridional/sagittal sections in 0°, 15°, 25° and 35° field angles. FIGS. 19A and 19B respectively show field curvature and distortion curves.

Table 9 compares focal lengths and other parameters across Examples 1 through 4.

TABLE 9

| | Example | | | |
|---|---|---|---|---|
| | 1 | 2 | 3 | 4 |
| FNo | 2.73 | 2.8 | 2.73 | 2.74 |
| ω (°) | 35 | 32 | 35 | 35 |
| θ (°) | 24 | 20.5 | 24 | 24 |
| T (mm) | 5.3 | 6.08 | 5.32 | 5.33 |
| f (mm) | 3.19 | 3.6 | 3.19 | 3.19 |
| T/f | 1.66 | 1.69 | 1.67 | 1.67 |
| f1/f | 0.64 | 0.68 | 0.64 | 0.7 |
| R2/R1 | 0.31 | 0.33 | 0.31 | 0.4 |
| d/R2 | 1.85 | 1.8 | 1.88 | 1.94 |
| (1/R3)/(1/R1 + 1/R2 + 1/R4) | 0.84 | 0.81 | 0.84 | 0.84 |

As seen in the above-described Examples 1–4, the present invention provides a low-cost image pick-up lens system with a field angle of at least 70°. The total length of the system is small, and the system appropriately corrects fundamental aberrations.

It is to be understood that the invention may be embodied in other forms without departing from the spirit thereof. Thus, the present exemplary embodiments are to be considered in all respects as illustrative and not restrictive, and the invention is not to be limited to the details given herein.

What is claimed is:

1. An image pick-up lens system comprising:
an aperture stop;
a biconvex first lens; and
a meniscus-shaped second lens having a concave surface on an object side,
wherein the aperture stop, the first lens and the second lens are aligned in that order from the object side to an image side, the first lens is aspheric on both convex surfaces thereof, the second lens has at least one aspheric surface, the first and second lenses are made from the same material, and the following conditions are satisfied:

$$0.5 < f1/f < 0.8, \tag{1}$$

$$0.31 < R2/R1 < 1.0, \text{ and} \tag{2}$$

$$1.0 < T/f < 1.7, \tag{3}$$

wherein, f1 is a focal length of the first lens, f is a focal length of the system, R1 is an absolute value of a radius of curvature of the first lens on an object side, R2 is an absolute value of a radius of curvature of the first lens on the image side, and T is a length from the aperture stop to an image pick-up surface of the image side.

2. The image pick-up lens system in accordance with claim 1, wherein the material comprises a plastic or a resin.

3. The image pick-up lens system in accordance with claim 2, wherein the first, and second lenses are made from a polyolefin resin or cyclo-olefin polymer material having low water absorbency.

4. The image pick-up lens system in accordance with claim 1, wherein the second lens is aspheric on both the concave surface thereof and an image side surface thereof, and the following condition is satisfied:

$$0.7 < (1/R3)/(1/R1 + 1/R2 + 1/R4) < 1.0$$

wherein, R3 is an absolute value of a radius of curvature of the second lens on the object side, and R4 is an absolute value of a radius of curvature of the second lens on the image side.

5. The image pick-up lens system in accordance with claim 1, wherein the aperture stop is formed on a surface of the first lens at the object side.

6. An image pick-up lens system comprising:
an aperture stop;
a biconvex first lens; and
a meniscus-shaped second lens having a concave surface on an object side,
wherein the aperture stop, the first lens and the second lens are aligned in that order from the object side to an image side, each of the first and second lenses has at least one aspheric surface, the lenses are made from the same plastic or the same resin, and the following conditions are satisfied:

$$1.0 < T/f < 1.7, \tag{1}$$

$$0.5 < f1/f < 0.8, \tag{2}$$

$$0.2 < R2/R1 < 1.0, \text{ and} \tag{3}$$

$$1.8 < d/R2 < 2.1, \tag{4}$$

wherein, T is a length from the aperture stop to an image pick-up surface of the image side, f is a focal length of the system, f1 is a focal length of the first lens, R1 is an absolute value of a radius of curvature of the first lens on the object side, R2 is an absolute value of a radius of curvature of the first lens on the image side, and d is a thickness of the first lens at its optical axis.

7. The image pick-up lens system in accordance with claim 6, wherein the first lens and the second lens each are aspheric on both surfaces thereof, and the following condition is satisfied:

$$0.7 < (1/R3)/(1/R1+1/R2+1/R4) < 1.0,$$

wherein, R3 is an absolute value of a radius of curvature of the second lens on the object hide, and R4 is an absolute value of a radius of curvature of the second lens on the image side.

8. The image pick-up lens system in accordance with claim 6, wherein the aperture stop is formed on a surface of the first lens at the object side.

9. An image pick-up lens system comprising:
an aperture stop;
a biconvex first lens disposed next to said aperture stop; and
a second lens disposed next to said first lens and aligned with said aperture stop and said first lens, and facing an image pickup surface opposite to said first lens, at least one of said first and second lenses having an aspheric surface, said second lens having negative refracting power with respect to said image pickup surface;
wherein the following conditions are satisfied:

$$0.5 < f1/f < 0.8, \quad (1)$$

$$0.31 < R2/R1 < 10, \text{ and} \quad (2)$$

$$1.0 < T/f < 1.7, \quad (3)$$

wherein, f1 is a focal length of said first lens, f is a focal length of the system, R1 is an absolute value of a radius of curvature of said first lens on an object side, R2 is an absolute value of a radius of curvature of said first lens on the image side, and T is a length from said aperture stop to said image pick-up surface.

10. The image pick-up lens system in accordance with claim 9, wherein said second lens is meniscus-shaped.

11. The image pick-up lens system in accordance with claim 9, wherein the system further satisfies the following condition:

$$0.7 < (1R/3)/(1/R1+1/R2+1/R4) < 1.0,$$

wherein, R3 is an absolute value of radius of curvature of the second lens on the object side, and R4 is an absolute value of a radius of curvature of the second lens on the image side.

12. The image pick-up lens system in accordance with claim 9, wherein said second lens is made of material the same as that of said first lens.

13. The image pick-up lens system in accordance with claim 12, wherein said material comprises a plastic or a resin.

14. The image pick-up lens system in accordance with claim 9, wherein the system further satisfies the following condition:

$$1.8 \leq d/R2 < 2.1,$$

wherein, d is a thickness of the first lens at its optical axis.

* * * * *